Sept. 1, 1953          F. T. WOOD          2,650,552

DOUGH ROLLING APPARATUS

Filed Nov. 1, 1950          4 Sheets-Sheet 1

INVENTOR.
Frank T. Wood
BY Robert S. Dunham

ATTORNEY

Sept. 1, 1953  F. T. WOOD  2,650,552
DOUGH ROLLING APPARATUS
Filed Nov. 1, 1950  4 Sheets-Sheet 2

INVENTOR.
Frank T. Wood
BY Robert S. Dunham

ATTORNEY

INVENTOR.
Frank T. Wood
BY Robert S. Dunlap

ATTORNEY

INVENTOR.
Frank T. Wood
BY Robert L. Dunham
ATTORNEY

Patented Sept. 1, 1953

2,650,552

UNITED STATES PATENT OFFICE 2,650,552

DOUGH ROLLING APPARATUS

Frank T. Wood, Barbados, British West Indies

Application November 1, 1950, Serial No. 193,326

11 Claims. (Cl. 107—46)

This invention relates to dough rolling apparatus and more particularly to devices to be employed in rolling out dough, e. g. by manual operation with a rolling pin or the like, as in the pastry-making and similar arts.

For example, in the usual methods of preparing many kinds of baked goods, such as pies, tarts, biscuits, crackers, cookies and the like, an important step involves rolling the dough into a sheet or layer of desired thickness. For best results, the thickness of the dough sheet should be chosen to suit the article in the course of preparation, and should be uniform throughout; yet by the customary practice of hand rolling on a board or like surface, difficulty is usually encountered in achieving the desired control, both as to the selected thickness of the sheet and with respect to its uniformity. While some proposals have heretofore been made to regulate the dough thickness by providing a rolling board having an elevated outer frame, upon which the ends of the rolling pin may rest, it has seemed necessary to employ somewhat complex mechanical means for adjusting the elevation of the frame, i. e. rather costly constructions, difficult to manipulate and involving a multiplicity of assembled pieces. Especially for household and like use, such devices would therefore tend to be unsuitable; complicated structures, moreover, are difficult to clean, and any separate, small parts are likely to be lost or mislaid at times when the apparatus is not in use.

Accordingly, an important object of the present invention is to provide dough rolling apparatus of simple and convenient structure, affording improved means whereby pastry dough or like material may be rolled or sheeted to a desired, uniform thickness.

Another object is to provide apparatus of the character described, embracing a rolling surface and associated means for supporting a rolling pin or like element, wherein novel and unusually convenient means are embodied for adjusting the elevation of the bearing edges for the rolling pin.

A further object is to provide a dough rolling device having adjustable means for support of a roller element, and capable of embodiment in unusually simple yet rugged structure, i. e. preferably without any separate, small parts. A specific object is to afford such apparatus, which may be used with a rolling pin of conventional character and which may be embodied in not more than two members, readily separable for cleaning and each having a considerable size. Still further objects include the provision of improved devices of the character stated which are relatively inexpensive to manufacture, easy to clean, convenient to store, eminently durable under long use and, at the same time, entirely satisfactory for the designated purposes of rolling dough.

To these and other ends, the invention, in its presently preferred forms, comprises a central member having a flat rolling surface and a ring member surrounding the central member, both members being very advantageously embodied in a circular configuration, or in some cases, a regular polygonal shape, e. g. of multi-sided character. The ring member has an upper edge which at least substantially surrounds the rolling surface and constitutes a bearing for a rolling pin or the like, i. e. near the ends of the latter as it is operated across the rolling surface. The two members are arranged and shaped so that one of them can be shifted in position, both vertically and rotatively, relative to the other.

Specifically, means are included, such as abutment surfaces or arrangements providing such surfaces, which lie in one or more helical, i. e. sloping paths, along the annular region where the two members adjoin. Such means being provided, for instance, on one member, the other member is equipped with cooperating abutment means either of simple nature or of like sloping configuration, these coacting parts being so shaped and arranged that one of the members may rest on the other in any of a plurality of angularly, i. e. rotatively, displaced positions. At the same time, supplemental means are included, most conveniently in combined embodiment with the vertical abutment means, for normally but releasably retaining the parts against rotative movement, viz. horizontal displacement of the adjustable member out of any one of the selectable angular positions. The retaining means are moreover such (for example, of the nature of lugs and slots, or other vertically-aligned surface structures) that release from their locked relation can be achieved by displacing one of the members vertically relative to the other.

In consequence, and especially by virtue of the helical or wedge-like arrangement of the mutual supporting means and the cooperating lugs or similar instrumentalities for releasably holding the parts against rotation, the ring and rolling surface members are so constituted that their assembly for use is merely a matter of fitting one within the other, while their mutual adjustment (to change the height of the bearing edge)

is accomplished by merely lifting, turning, and re-seating one of them.

Pursuant to these structural principles, the apparatus may be embodied in a wide variety of forms, of which all are essentially characterized by the simplicity, ruggedness and ease of manipulation set forth above.

By way of example, a number of such embodiments are described below and illustrated in the accompanying drawings, wherein.

Referring first to Figs. 1-4 inclusive, the device there shown includes a circular base or central member 30, i. e. of cylindrical configuration about a vertical axis, the member 30 being conveniently, although not necessarily, mounted on a wider, circular base 31. Spaced about the side surface of the member 30 are a plurality of lugs or projections 32. Although greater or less of these abutment members may be employed, the illustrated device includes six of them spaced at equal angles around the periphery of the member 30. The upper, rolling surface 34 of the member 30 is a flat, i. e. plane surface upon which the dough is to be rolled.

A removable ring 35 is disposed around the cylindrical periphery of the member 30, and carries means arranged in helical or sloping paths for selective cooperation with the abutment members 32 to hold the ring at any of several selectable positions varying in elevation. Specifically, the last-described means comprising a plurality of groups 36 of slots or notches 37, which open downwardly and are shaped to seat over the lugs 32, i. e. with the upper surface of the lug abutting the bottom, i. e. the upper end surface, of a slot 37. As shown, the slots 37 in each group are arranged in a series of varying height, conveniently in a progressive array ranging from the deepest or highest slot $37a$ to the lowest or shortest $37f$. Thus, since the lugs 32 and the slot groups 36 are distributed in equivalent manner, respectively around the periphery of the roller surface member 34 and the ring member 35, the ring may be seated with the lugs engaging such of the slots or notches as correspond to any desired level of adjustment, i. e. with each lug engaging a notch 37 of the same, selected height. So assembled, the ring is firmly seated in relation to the rolling face member 30, and at a predetermined elevation gauged by the height of the selected notches. The upper edge 38 of the ring 35 conveniently lies in a plane parallel to the surface 34 and thus affords rolling support for the end portions of a rolling pin 40.

It will now be seen that with the parts so assembled, the ring may be set to any desired elevation of its edge relative to the rolling surface 34 simply by lifting it from the lugs 32, turning it to an appropriate extent and re-seating it with the lugs in notches of another height. In the arrangement shown, having six notches 37 for each group 36, six corresponding elevations of the bearing edge 38 can be selected. For example, the lowest may be level with the surface 34, for use when rolling operation is desired without the aid of the bearing edge. The remaining notches may provide successive increments of height for the edge 38 above the surface 34, for example differing by $\frac{1}{16}$ of an inch and thus ranging from a minimum of $\frac{1}{16}''$ at the notches $37b$ to a maximum elevation of $\frac{5}{16}''$ at the notches $37f$.

It will be appreciated that other numbers of notches may be employed in each group, e. g. to provide a greater or less variety of vertical adjustment, and the relative arrangement of the notches may lie in different helical paths, e. g. involving greater or less difference between successive notches, or even a predetermined non-uniformity or non-regularity of incremental difference. Similarly, as indicated above, greater or less numbers of the support structure groups 36 (and corresponding lugs 32) may be employed; although at least four are ordinarily needed for useful support, more advantageously five, or indeed preferably six or more, will provide very superior stability in most cases.

Figure 1:
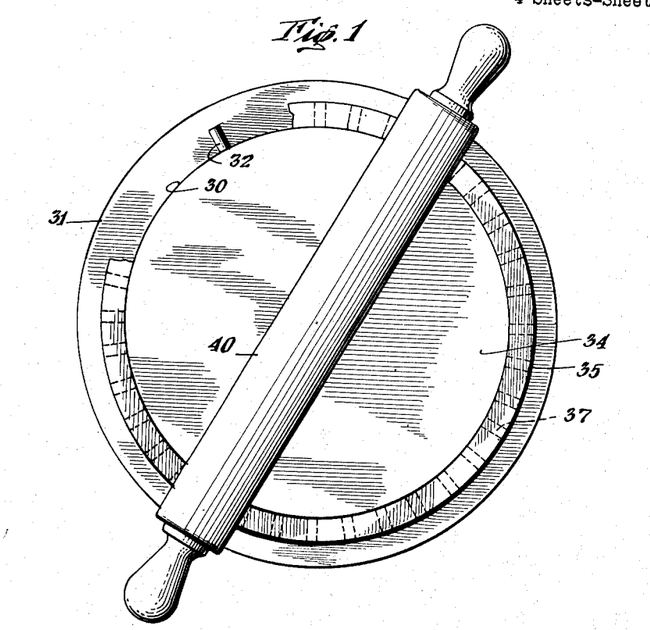
Fig. 1 is a plan view of one form of the dough rolling device with a rolling pin in place and within a portion of the supporting ring broken away.
Figure 2:
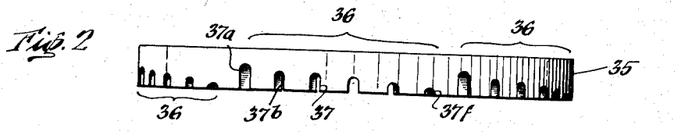
Figs. 2 and 3 are elevations respectively of the ring member and the central rolling surface member of Fig. 1.
Figure 3:
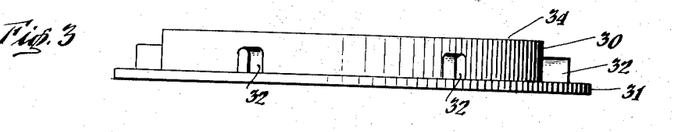
Figure 4:
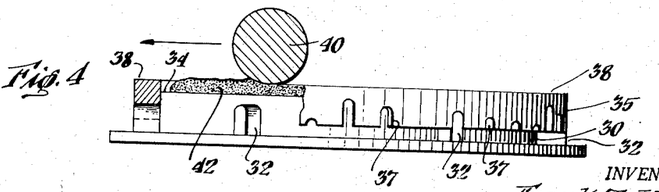
Fig. 4 is an elevation of the assembled device with the rolling pin and part of the ring in transverse vertical section to show the relationship of parts in use.
Figures 5, 8:
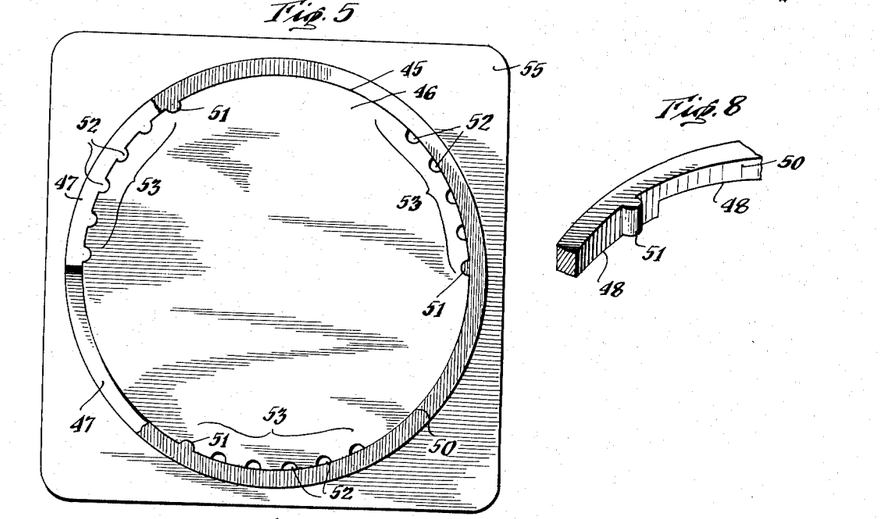
Fig. 5 is a plan view of a modified form with a part of the ring broken away.
Fig. 8 is a fragmentary perspective view showing the inner face of the ring of Fig. 6.
Figure 6:
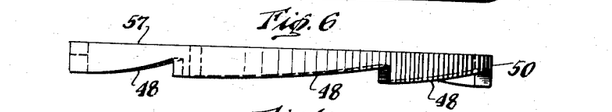
Figs. 6 and 7 are elevations respectively of the ring and rolling surface member of Fig. 5.

The operation of the device is thus entirely simple and convenient. The user simply rests the base member on a table or like support, and seats the base member in place, adjusting the latter (by lifting and turning it as necessary) to the desired elevation of the edge 38, i. e. thus setting the thickness to which the sheet of dough will be rolled. The dough is then placed on the surface 34 and rolled out with the roller element 40 in the usual fashion, i. e. progressively reducing it to a flattened condition. In the final passes of the rolling pin, as shown in Fig. 4, the dough mass 42 is reduced to a thickness exactly equal to the height of the edge 38, the ends of the pin 40 then resting squarely and firmly on the surrounding circular edge. In consequence, a well developed sheet or layer of dough is produced at a desired and entirely uniform thickness, and when completed, may be easily removed for its intended use. Indeed, if it is desired to employ some implement for separating or taking away the dough sheet, the ring 38 can be easily lowered or removed for better access to the surface 34.

Upon completion of operations, there are only two elements (e. g. the ring 35 and the central member 30), each of convenient size, to be cleaned and stored. Indeed, the essentially simple configuration of both parts and the lack of any fitted bearings, shafts, levers, or the like, greatly facilitates the cleaning operation and makes it very easy to keep the device in a thoroughly sanitary condition at all times.

Figs. 5–8 inclusive show another embodiment wherein the central member 45 carrying the flat rolling surface 46 has a surrounding annular structure providing a series of sloping or wedge-like surfaces 47 which face upwardly and are adapted to be engaged by similar downwardly-facing surfaces 48 of the ring member 50. The inner wall of the ring 50 carries, in angularly spaced relation, a small plurality of vertical ribs or lugs 51, each of which is adapted to seat into one or another of the vertical grooves 52 of a corresponding set or group 53 of such grooves, formed in the side wall of the rolling surface member 45, i. e. above the sloping surfaces 47.

The device of Figs. 5–8 is shown with a square base 55 secured to, or forming part of the central member 45. It will be understood, however, that the nature of the base, whether round, square, or of footed or other design or shape, may vary in the case of each of the several modifications of the invention; for example, either of the devices of Figs. 1–4 and Figs. 5–8 may be provided with any desired type of base, or indeed no additional base structure beyond the peripheral boundary of the central, rolling surface member.

It will now be seen that the function and use of the device in Figs. 5–8 is essentially the same as for that of Figs. 1–4. The ring member 50 is rotatively adjustable to various angular positions relative to the central member 45, the similarly-sloping, facing surfaces 47, 48 being disposed to coact for elevation of the ring to any desired extent, i. e. in accordance with their mutual angular disposition. The rib 51 and the grooves 52 afford means to prevent rotative displacement in any of the series of selected positions. The ring in each instance is located by lifting it and then re-seating it so that the ribs or lugs 51 slide downwardly into the selected grooves 52, the same groove in each of the sets 53 thus corresponding to a selected one of the several elevations of the ring. The upper edge 57 of the ring constitutes a bearing surface for the rolling pin or like element (not shown in these views) and the device is used exactly as above described for rolling pastry or the like to any desired thickness, with unfailing uniformity and accuracy.

It may be noted that the foregoing and indeed all other embodiments of the invention can be manufactured of any suitable material or materials, e. g. plastic, wood, metal, porcelain, glass, or others, or any combinations of them. While in some cases either or both of the principal members, i. e. the ring device and the structure providing the rolling surface, may be of composite nature, a particular advantage of the illustrated embodiments is that each of the two members can, if desired, be fashioned as a single, integral piece of material. Thus, each of these elements can be quite easily molded, pressed, or otherwise produced from any of a variety of plastic substances, e. g. of thermo-plastic, thermo-setting, or other type, or may alternatively be cast or molded of vitreous or ceramic material; or each part may be made as a casting of aluminum, aluminum alloy, or other metal, or indeed may be appropriately pressed or stamped from sheet metal such as aluminum, stainless steel, or the like.

Referring again specifically to the device of Figs. 5 through 8, it should be noted that whereas three groups 53 of grooves 52, and corresponding lugs 51 on the ring 50 are shown in the drawings, other numbers of sets of these elements may be employed as desired. Indeed, since the actual support of the ring is provided at a multiplicity of localities by the engagement of the helical surfaces 48 with the corresponding, like surfaces 47, a single rib and set of grooves may suffice in some cases, although at least two or three sets seem ordinarily desirable for greater convenience and stability. Similarly, although each annular row of helical surfaces (the term helical being intended to indicate the sloping or wedge-like nature of the instrumentalities such as these surfaces or the slots of Fig. 2, arranged so as to extend or be positioned in a generally annular manner) consists here of six such surfaces arranged in saw-tooth fashion at essentially the same level, greater or less numbers of such surfaces may be employed, or other arrangements of them extending part or all of the way around the device.

A further modification is shown in Figs. 9 to 12 inclusive, which is similar to the device of Figs. 5 to 8 inclusive, having a circular central member 65 providing the rolling surfaces 66 and surrounded by a series of sloping surfaces 67 which coact with the like surfaces 68 of the ring 70. Here the inner member 65 (instead of the ring) carries projecting vertical ribs or lugs 71 which respectively cooperate with the grooves 72 arranged in groups 73 on the inner wall of the ring. The selective function of the ribs and grooves is otherwise essentially the same, in that the ring is seated with one or another of the grooves of each set 73 engaging the corresponding lug 71 and thus positioning the ring at one or another of the selectable elevations.

While as shown in the other figures, the upper edge of the ring may be a plane face parallel to the central rolling surface, Figs. 9 to 12 illustrate an alternative arrangement wherein the upper face of the ring slopes downwardly and outwardly so as to provide a sharp edge 76 at its inner periphery. Such edge is of special advantage in many pastry rolling operations, since it affords means for severing the rolled sheet of dough, i. e. by simple coaction of the rolling pin with the sharp edge 76, at the periphery of the rolling surface 66. In such way, it is possible to roll the dough, if desired, completely to the boundary of the surface with a clearly defined boundary for the dough sheet. Furthermore, this structure provides essentially automatic removal of excess dough, e. g. in cases where the latter might overflow, so to speak, onto the edges of the ring and there build up in a manner to interfere with true bearing of the rolling pin directly upon the ring. It will be understood that the sharp edge structure is not limited to the device of Figs. 9 to 12, but may be embodied in the same way and with equal advantage in all other forms of the invention.

Figures 7, 9, 12:
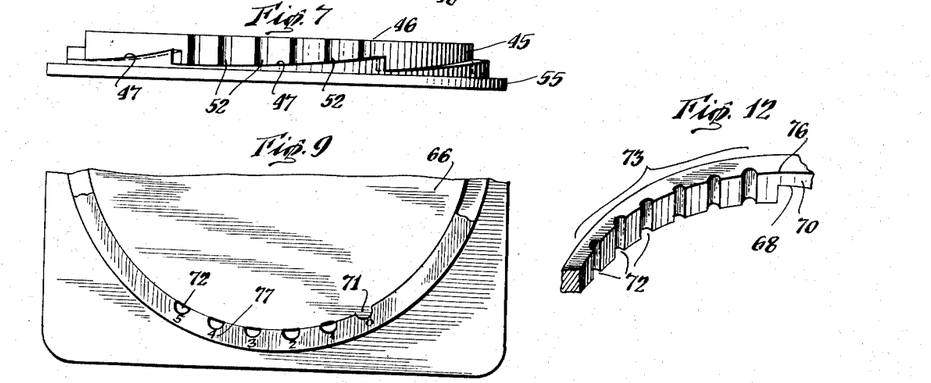
Fig. 9 is a fragmentary plan of another modification.
Fig. 12 is a fragmentary perspective view showing the inner face of the ring of Fig. 9.
Figures 10, 11:
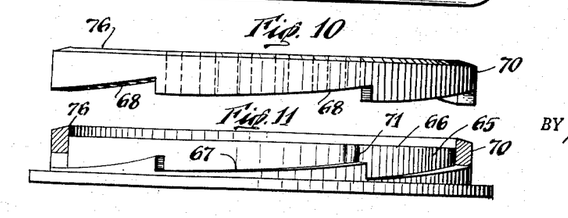
Fig. 10 is an elevation of the ring of Fig. 9.
Fig. 11 is an assembled view of the device of Fig. 9, chiefly in elevation but with the ring in central vertical section.

It may also be noted that as shown in Fig. 9, suitable indicia may be applied to the ring or central member or other portion of the assembly, to indicate the actual relative position of the parts, such indicia reading in actual elevations, or in simple reference numbers, or even with specific legends relating to the types of pastry or baked articles for which various heights are suitable. Thus, in Fig. 9 the grooves 72 of the ring are severally marked with numbers, say from "0" to "5" where the device provides six levels of adjustment, the numbers thus representing the relative heights to which the ring is raised when the lug 71 of the central member is positioned in one or another of the grooves.

Figure 13:
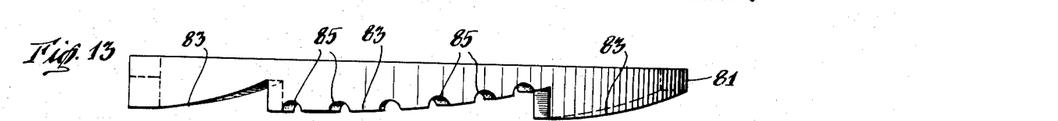
Figs. 13 and 14 are elevations respectively of the ring and rolling surface member of a further modification.
Figure 14:
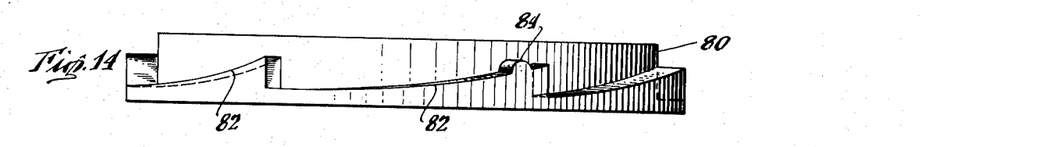

Figs. 13 and 14 illustrate a further modification of arrangements such as shown in Figs. 5 to 12 inclusive. Here instead of vertical grooves and projections, the central member 80 and the ring 81, which are rotatably adjustable in height by virtue of the coacting sloping surfaces 82, 83, are locked in selected position by ribs and notches on the facing helical surfaces themselves. Thus, for instance, one or more of the surfaces of one set, e. g. the surface 82, may carry a projection or lug 84 while the immediately corresponding surface or surfaces of the other member may be formed with a group of notches 85 each adapted to receive the lug 84 and thus selectively arranged to hold the parts in any one of the various positions.

It will be appreciated in passing, that not only are other forms or arrangements of the structure possible, wherein the helical supporting means is provided upon only one of the two coacting members (e. g. as in Figs. 1 to 4), but various combinations of even the specific structural parts here shown are feasible. Thus, for example, the ring of Fig. 13 may itself be substituted for the ring 35 of Figs. 1 to 4, the grooves 85 then seating on the lugs 32 and performing essentially the same function as the notches 37 of Figs. 2 and 4. In such case, as will now be appreciated, it is ordinarily preferable that a complete set of grooves 85 be provided on each face 83, since the lugs and grooves then constitute the sole vertical support of the ring.

Figure 15:
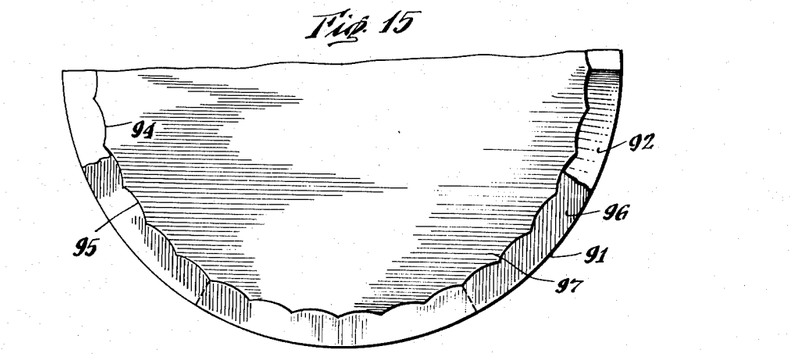
Fig. 15 is a fragmentary plan of another embodiment.
Figure 16:
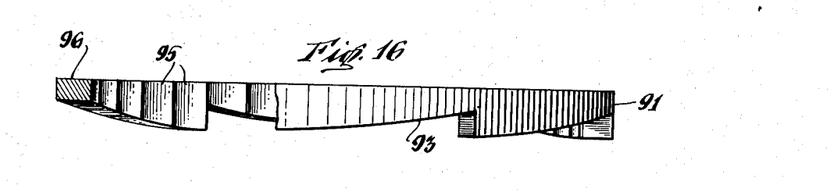
Figs. 16 and 17 are elevations respectively of the ring and rolling surface member of Fig. 15.
Figure 17:
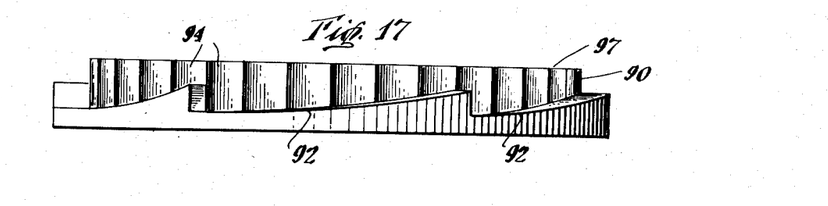
Figure 18:
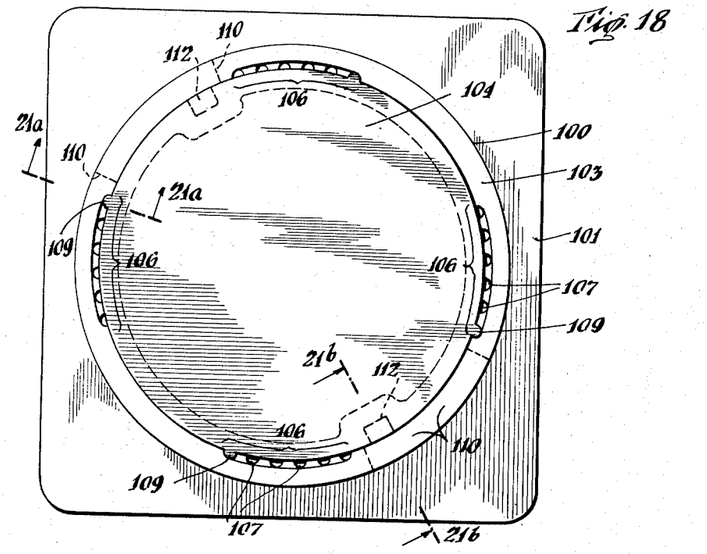
Fig. 18 is a plan view of another form of the invention.
Figure 19:
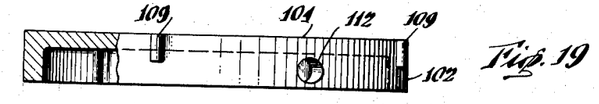
Figs. 19 and 20 are elevations respectively of the rolling surface member and ring member of Fig. 18, both partly broken away in central section.
Figure 20:
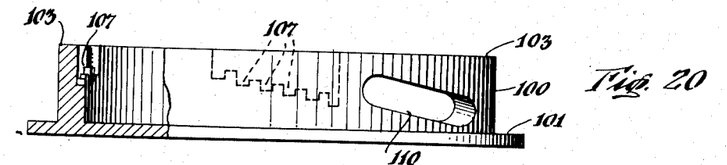
Figure 21:
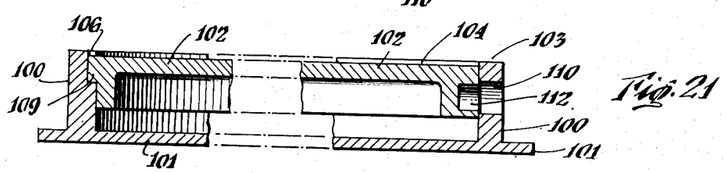
Fig. 21 is a composite, vertical section, showing the central member as if on lines $21a$—$21a$ and $21b$—$21b$ of Fig. 18, but in a somewhat different angular position relative to the ring member.

Figs. 15 to 16 show another form of the device, wherein the central member 90 and the ring member 91 may be provided with opposed, sloping surfaces 92, 93, respectively, arranged in similar fashion to like elements of Figs. 5 to 12. Here, however, the means for preventing rotative displacement of the parts may constitute an appropriately repeated or like configuration of the vertical walls, for example a continuous, vertical fluting of conforming, complementary shapes on the outer wall of the member 90 and the inner face of the ring member 91. While a series of flat faces, steps or other configurations may be employed, Figs. 15 to 16 show by way of example a series of shallow, concave, vertically extending recesses 94 around the central member 90, which receive in vertically sliding fashion, the mating, shallow ribs or scallop-like shapes 95 formed on the inner face of the member 91. With such arrangement the ring is (as in other cases) adapted to be seated against rotative displacement by the conforming fit of the flutes and recesses, in any of a plurality of selectable positions, each corresponding to a different level of the upper ring edge 96 relative to the rolling surface 97.

While in the various specific devices hereinabove described the central member has been constituted as the base of the assembly and the ring arranged to seat upon it in vertically and angularly shiftable relation, Figs. 18 to 21 show an alternative arrangement wherein the ring 100 itself essentially constitutes the base, in this instance being formed or associated with an underlying base portion 101. The central member 102, surrounded by the ring, is then arranged to be shifted vertically and rotatively for the desired positional adjustment of the upper ring edge 103 relative to the rolling surface 104 of the central member 102. Here, for example, the helical supporting surface means may be constituted by groups 106 of stepwise-arranged notches 107, recessed in the inner wall of the ring member 100 and distributed annularly about such wall. For coaction with the recesses, the member 102 carries a plurality of ribs or lugs 109, i. e. one such vertically extending lug for each group 106 of the recessed notches. Thus the rolling surface member 102 may be seated at any of various elevations by downwardly sliding the lugs 109 into one or another of the corresponding notches.

For operating access to the central member, i. e. to raise or lower it, the ring 100 may be appropriately apertured, for example with an elongated sloping slot 110 at each of a plurality of localities around the device. Adjacent the slots 110 (there being two such slots in the device shown) and accessible through them, are corresponding recesses or finger holes 112 in the side wall of the central member 102. As shown, the recesses 112 are so positioned that as the lugs 109 are moved from one to another along the series of notches 107, the recesses 112 progress lengthwise of the sloping slots 110. With this relation, the manipulation of the central member 102 is greatly expedited; for example, after preliminarily seating the member 102 inside the ring (with the lugs 109 necessarily located somewhere in the recessed portions 106), the operator then simply inserts a finger through each of the slots 110 and into the corresponding recess 112, the fingers then being easily moved to effect the slight elevation and turning of the member 102, appropriate for its adjustment to any selected height, i. e. with each rib 109 seated in a selected notch 107.

In other respects, the arrangement of Figs. 18 to 21 is generally similar to the devices of other views, and the operation for rolling dough is exactly the same.

Figure 22:
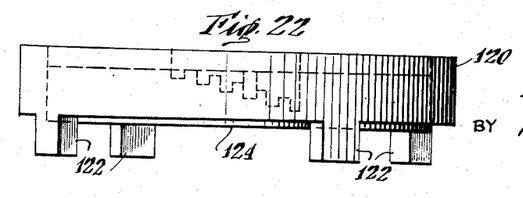
Fig. 22 is an elevation of a modified form of the embodiment shown in Fig. 18.

Instead of closing the ring 100 by a lower base member and then providing the access slots 110 through the wall of the ring, the ring may be itself supported, i. e. by other base structure, in a manner affording like access. Thus, in Fig. 22, the ring 120 is carried on four or more legs 122 at a sufficient elevation so that the operator can easily reach beneath the ring to engage the central member 124, for lifting and turning it to adjust the mutual vertical position of the parts. It will be understood that the helical supporting means and other structural relations of the elements in Fig. 22 may be conveniently arranged as elsewhere described herein, for example with the ring and central member shaped exactly as the ring 100 and the member 102 of Figs. 18 to 21.

It will now be seen that the illustrated apparatus provides a remarkably simple and effective device for rolling dough or the like to a selected, uniform thickness. The structure is in all respects unusually sturdy and efficient, preferably requiring only two parts and being arranged for adjustment, i. e. to any of a variety of heights or thicknesses for the rolled sheet, in a notably simple and convenient manner. While other peripheral configurations of the central and ring members (at their adjoining boundaries), such as polygonal shapes, e. g. regular plane figures having at least several and preferably 5, 6 or more sides may be used (the rotative displacement from one elevation to another then usually involving a relatively large angular movement), important advantages of convenience, simplicity of manufacture, and stability both of working support and against inadvertent derangement or deformation, are served by the circular or approximately circular shape of the parts as herein specifically illustrated. As indicated, however, the essential principles of structure and operation, including the annular arrangement of sloping support, i. e. the helical surface means, can be readily embodied with other shapes and forms of the members, to provide useful structures. It should also be noted that the circular or at least many-sided polygonal configuration of the ring and central surface provide special convenience in respect to the use and provision of the cooperating rolling pin 40, for example in permitting effective results with a rolling pin of minimum length, and in allowing the rolling operation to be performed in any direction, without having to take special account of the relation of the length of the roller element to the transverse distance between the bearing edges.

It is to be understood that the invention is not limited to the specific structures herein shown and described, but may be embodied in other forms without departure from its spirit.

I claim:

1. Dough rolling apparatus, comprising means providing a flat rolling surface, and means surrounding the surface means and having an upper edge to provide a bearing for a roller element, one of said means being rotatably shiftable relative to the other into a plurality of angular positions, said first and second means respectively having mutually engageable portions shaped for support of one of said first and second means by the other resting upon it, said mutually engageable portions including helically-extending supporting surface means on at least one of said first and second means, adapted to locate the second means with its upper edge in progressively elevated positions relative to the rolling surface respectively at the aforesaid angular positions, said mutually engageable portions being respectively fixed to the said first and second means and being shaped to be separated at every one of said elevated positions by only lifting one of said first and second means relative to the other, and said first and second means including substantially vertical faces integral with the first and second means and mutually engageable in each of said angular positions and releasable on vertical displacement of one of said means relative to the other, for retaining said first and second means against mutual rotative displacement from each of said angular positions.

2. Dough rolling apparatus, comprising a substantially circular member having a flat rolling surface, a substantially circular ring member coaxially surrounding the first member and having an upper bearing edge for a roller element, one of said members being rotatively shiftable relative to the other about their common axis, one of said members having helically extending supporting structure disposed peripherally around it and the other member having cooperating structure vertically engageable with and vertically separable from the supporting structure at a plurality of angular positions of the shiftable member, for selectively holding one of said members on the other with the bearing edge of the ring member at different elevations, relative to the rolling surface, respectively corresponding to said angular positions, and means including substantially vertical, mutually engageable faces integral with the members and mutually releasable upon mutual vertical displacement of the members, for retaining the members against mutual rotative displacement in each of said angular positions.

3. Dough rolling apparatus, comprising a member providing a flat rolling surface, a ring member surrounding the first member and having an upper bearing edge for a roller element, one of said members being shaped relative to the other member to be both lifted and reseated relative to the other member both directly from and directly into each of at least several positions angularly displaced around the common axis, said one of the members being adapted to be turned, when it is lifted from each position, selectively into each of the other of said positions, and mutually engageable supporting and retaining structures respectively fixedly embodied with the members and annularly arranged on each member and directly releasable by the aforesaid lifting of one member relative to the other, for selectively seating one member on the other in each of the aforesaid angular positions, at least one of said structures including sloping surface means receiving the other structure at different positions along said sloping surface means, for selectively vertically positioning the members with the said edge of the ring member at different elevations, relative to the rolling surface, which correspond to said positions, said structures including portions mutually shaped and mutually abutting along substantially vertical surfaces, to prevent mutual rotation of the members in each seated position.

4. Dough rolling apparatus, comprising a member providing a flat rolling surface, a boundary member coaxially surrounding the first member and having an upper bearing edge for a roller element, one of said members being adapted to be lifted, turned and reseated relative to the other member into each of a plurality of positions angularly displaced around the common axis, vertically separable, mutually abutting means arranged annularly of said axis on the respective members, for said mutual seating of the members, at least one of said means comprising a plurality of surface structures for abutment with the other means, said structures being distributed annularly about said axis and each of said structures lying in a sloping path for locating the members with the edge of the boundary member at different elevations relative to the rolling surface, respectively in the aforesaid seated positions, said members respectively including means releasable on lifting one member and cooperatively shaped to prevent mutual rotation of the members in each seated position, each of said surface structures comprising a substantially horizontal array of substantially vertical slots having their bottom surfaces arranged stepwise in the sloping path, another of the mutually abutting means comprising a plurality of substantially vertical lugs respectively corresponding to the arrays of slots and arranged so that each lug is adapted to seat in a slot selected from its corresponding array in accordance with the angular position of the members, the aforesaid means to prevent rotation of the members being constituted by the sides of the slots and lugs.

5. Dough rolling apparatus, comprising a member providing a flat rolling surface, a boundary member coaxially surrounding the first member and having an upper bearing edge for a roller element, one of said members being adapted to be lifted, turned and reseated relative to the other member into each of a plurality of positions angularly displaced around the common axis, vertically separable, mutually abutting means arranged annularly of said axis on the respective members, for said mutual seating of the members, at least one of said means comprising a plurality of surface structures for abutment with the other means, said structures being distributed annularly about said axis and each of said structures lying in a sloping path for locating the members with the edge of the boundary member at different elevations relative to the rolling surface, respectively in the aforesaid seated positions, said members respectively including means releasable on lifting one member and cooperatively shaped to prevent mutual rotation of the members in each seated position, each of said mutually abutting means comprising a plurality of surface structures distributed annularly and each lying in a sloping path as aforesaid, each of the surface structures thereby associated with one member comprising an upwardly facing, sloping surface and each of the surface structures thereby associated with the other member comprising a downwardly facing, sloping surface, said upwardly and downwardly facing surfaces sloping in parallel directions and being arranged to face each other in like annular regions.

6. Dough rolling apparatus, comprising a member providing a flat rolling surface, a ring member surrounding the first member and having an upper bearing edge for a roller element, means on one of said members, providing a plurality of vertically-facing sloping surface structures distributed annularly about the axis of the member, abutment means on the other of the members adapted to engage said surface structures at each of a plurality of angular positions of one member relative to the other, for correspondingly adjusting the level of said bearing edge, said surface structures and said abutment means being mutually shaped for disengagement from each other at each of said angular positions by directly lifting one member from the other, and said members having cooperating structures engageable along substantially vertical surfaces and releasable on vertical displacement of one member relative to the other, for holding the members against mutual rotation in each of said positions.

7. Dough rolling apparatus comprising a member providing a flat rolling surface and having annularly distributed, upwardly facing abutment means around said surface, a ring member surrounding the first member and having an upper bearing edge for a roller element and having annularly distributed, downwardly facing abutment means adapted to engage the abutment means of the first member, said ring member being thereby seated on the first member and adapted to be lifted, turned and reseated in a plurality of angularly spaced positions, at least one of said abutment means comprising a plurality of sloping surface structures cooperating with the other abutment means to locate the ring member at different elevations respectively corresponding to the aforesaid positions, said members having cooperating structures releasable on lifting the ring member, for holding the members against mutual rotation in each of said positions, said sloping surface abutment means comprising a series of groups of vertical notches, the notches of each group being graduated in height, the other abutment means comprising a corresponding series of vertical lugs each adapted for selective engagement in the notches of one group, and the said notches and lugs having vertical walls respectively constituting the cooperating structures for holding the members against rotation.

8. Dough rolling apparatus, comprising a circular member having a flat upper surface, a circular ring member coaxially surrounding said member and having an upper bearing edge for a roller element, mutually facing abutment means annularly arranged on each member, said abutment means being separable on lifting the ring member, the abutment means of at least one member comprising an annularly distributed series of sloping surfaces structures cooperating with the abutment means of the other member to adjust the elevation of the ring member in accordance with its angular position around the first member, said abutment means of the respective members being mutually shaped for disengagement of the members from each other at each of several different angular positions by directly lifting one member from the other, and said members including structures engageable along substantially vertical surfaces and releasable on lifting the ring member for holding the ring member against rotative displacement from each of at least several angular positions.

9. Dough rolling apparatus, comprising a circular member having a flat upper surface, a circular ring member coaxially surrounding said member and having an upper bearing edge for a roller element, mutually facing abutment means annularly arranged on each member, said abutment means being separable on lifting the ring member, the abutment means of at least one member comprising an annularly distributed series of sloping surface structures cooperating with the abutment means of the other member to adjust the elevation of the ring member in accordance with its angular position around the first member, said members including structures releasable on lifting the ring member for holding the ring member against rotative displacement from each of at least several angular positions, each of the abutment means comprising an annular series of more than four sloping surfaces, all of the surfaces sloping in the same helical direction around the members, the said sloping surfaces of the first member being disposed in upwardly facing position around it and below the ring member and the said sloping surfaces of the ring member being disposed to face downwardly, against said surfaces of the first member.

10. Apparatus as described in claim 9 in which the structures for holding the ring member comprise a vertical lug on one member facing the other and a series of vertical grooves on the other member selectively adapted to receive the lug.

11. Dough rolling apparatus comprising means providing a flat rolling surface, means surrounding the surface means and having an upper edge to provide a bearing for a roller element, said first and second mentioned means having coacting means for selectably locating and retaining said first and second means in each of a plurality of positions that provide corresponding different elevations of the said upper edge relative to the rolling surface, said coacting means including sloping surface structure annularly associated with one of said first and second means, and sloping in an annular direction around the rolling surface, cooperating structure on the other of said first and second means shaped to abut said sloping structure at different positions along the slope, spaced angularly about said rolling surface and being the aforesaid first-mentioned positions, for correspondingly providing said different elevations of said upper edge, said sloping and cooperating structures being mutually shaped for separation from abutting relation in each of said different positions by directly lifting one of said first and second means from the other, and said coacting means including substantially vertical faces on the first and second means mutually engageable in each of said different positions of said first and second means for preventing said cooperating structure from moving along the sloping structure when the structures are in abutting relation.

FRANK T. WOOD.

References Cited in the file of this patent

UNITED STATES PATENTS

| Number | Name | Date |
|---|---|---|
| 337,342 | Kutzner | Mar. 2, 1886 |
| 781,239 | Staassen | Jan. 31, 1905 |
| 1,702,144 | Weston | Feb. 12, 1929 |
| 2,181,666 | Molin | Nov. 28, 1939 |
| 2,524,705 | Huseby | Oct. 3, 1950 |